United States Patent
Miller et al.

(10) Patent No.: US 9,950,612 B2
(45) Date of Patent: Apr. 24, 2018

(54) METHODS AND SYSTEMS FOR ADJUSTING VEHICLE GRILLE SHUTTERS BASED ON ENGINE OPERATION

(71) Applicant: Ford Global Technologies, LLC, Dearborn, MI (US)

(72) Inventors: Kenneth James Miller, Canton, MI (US); Douglas Raymond Martin, Canton, MI (US); William Paul Perkins, Dearborn, MI (US); Daniel Mark Schaffer, Brighton, MI (US); John Curtis Hickey, Belleville, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 376 days.

(21) Appl. No.: 14/742,335

(22) Filed: Jun. 17, 2015

(65) Prior Publication Data

US 2016/0368366 A1    Dec. 22, 2016

(51) Int. Cl.
*B60K 11/08* (2006.01)
*F01P 7/12* (2006.01)

(52) U.S. Cl.
CPC ............. *B60K 11/085* (2013.01); *F01P 7/12* (2013.01); *Y02T 10/88* (2013.01)

(58) Field of Classification Search
CPC . B60K 11/085; F01P 7/12; F01P 7/026; F01P 7/06; F02B 29/0431
USPC ...................................................... 236/35.2
See application file for complete search history.

(56) References Cited

U.S. PATENT DOCUMENTS

| | | | |
|---|---|---|---|
| 4,549,504 A * | 10/1985 | Gaines | F01P 7/026 123/41.01 |
| 6,308,664 B1 * | 10/2001 | Ambros | F01P 7/048 123/41.05 |
| 8,311,708 B2 | 11/2012 | Kerns | |
| 8,505,660 B2 | 8/2013 | Fenchak et al. | |
| 8,655,545 B2 | 2/2014 | Yu et al. | |
| 8,833,313 B2 | 9/2014 | Lockwood et al. | |
| 8,925,527 B2 | 1/2015 | Styles et al. | |
| 2011/0247779 A1 | 10/2011 | Charnesky et al. | |
| 2011/0281515 A1 * | 11/2011 | Lockwood | B60K 11/085 454/75 |
| 2012/0097464 A1 | 4/2012 | Waugh | |
| 2014/0109846 A1 | 4/2014 | Styles et al. | |

(Continued)

OTHER PUBLICATIONS

JP 2014-148194 (English Translation).*

(Continued)

*Primary Examiner* — Jonathan Bradford
(74) *Attorney, Agent, or Firm* — Julia Voutyras; McCoy Russell LLP

(57) ABSTRACT

Methods and systems are provided for adjusting grille shutters based on engine coolant temperature and a difference in aerodynamic drag between the grille shutter positions. In one example, the grille shutters may be adjusted into a position closer to a first smaller opening when a difference in aerodynamic drag between the first and second positions is large. In other examples, the grille shutters may be adjusted into a position closer to the second larger opening when a difference in aerodynamic drag between the first and second positions is small thus maintaining the engine at lower temperatures.

20 Claims, 4 Drawing Sheets

(56) References Cited

U.S. PATENT DOCUMENTS

2014/0110488 A1    4/2014   Surnilla et al.
2014/0251239 A1    9/2014   Richards et al.
2014/0299077 A1   10/2014   Sowards et al.
2015/0147949 A1    5/2015   MacFarlane et al.
2015/0149043 A1    5/2015   MacFarlane et al.

OTHER PUBLICATIONS

Shigarkanthi, V, et al., "Application of Design of Experiments and Physics Based Approach in the Development of Aero Shutter Control Algorithm," SAE Technical Paper Series No. 2011-01-0155, SAE International, Apr. 12, 2011, 8 pages.

\* cited by examiner

METHODS AND SYSTEMS FOR ADJUSTING VEHICLE GRILLE SHUTTERS BASED ON ENGINE OPERATION

FIELD

The present description relates generally to methods and systems for controlling engine cooling via vehicle grille shutters positioned at a front end of a vehicle.

BACKGROUND/SUMMARY

A vehicle grille is typically located at a front end of a vehicle, and can be configured to provide an opening through which intake air is received from outside of the vehicle, such as a grille opening or bumper opening. Such intake air may then be directed to an engine compartment of the vehicle to assist the vehicle's cooling system in cooling the engine, transmission, and other such components of the engine compartment. Such air flow via the grille may add aerodynamic drag when the vehicle is in motion. Accordingly, grilles may include grille shutters to block such air flow, thus reducing aerodynamic drag and improving fuel economy. Closed grille shutters may also provide a faster powertrain warm-up which may improve fuel economy since there is less friction, and may improve the performance of the passenger compartment heater. However, closed grille shutters also reduce the air flow through the radiator and other components for cooling purposes. As a result, engine temperatures such as engine coolant temperature (ECT) may increase. Thus, grille shutter operation may include increasing or decreasing the quantity of the opening of the grille shutters based on engine cooling demands and vehicle driving conditions.

One example approach for adjusting grille shutters is shown by Kerns et al. in U.S. Pat. No. 8,311,708. Therein, vehicle grille shutters are adjusted in response to engine temperature and a non-driven vehicle condition. For example, when engine temperature is above a threshold temperature, the grille shutters may be opened.

However, the inventors herein have recognized potential issues with such systems. As one example, the grille shutters may open in response to ECT increasing above a first threshold temperature. However, the ECT may continue to overshoot past the first threshold until the ECT begins to cool down due to the opened grille shutters. Then the grille shutters close in response to ECT decreasing below the first threshold or a second threshold, lower than the first. However, the ECT may continue to undershoot past the second threshold until the ECT begins to heat up again due to the closed grille shutters. Controlling the ECT in response to one or more set thresholds, based on a current ECT, may result in degraded aerodynamics and fuel economy. At the same time, not opening the grille shutters soon enough (at the appropriate threshold) or by a large enough amount to compensate for an increasing ECT may cause engine temperatures to continue to increase, thereby degrading engine performance.

In one example, the issues described above may be addressed by a method for adjusting active grille shutters positioned at a front end of a vehicle into a position, such as a final position, at or between a first position having a smaller amount of opening and a second position having a larger amount of opening based on a rate of change of an engine coolant temperature and a difference in aerodynamic drag between the first and second positions. In this way, by continuously adjusting the grille shutter opening between the first and second position based on the thermal cooling requirements of the engine and the estimated aerodynamic drag, overheating or overcooling of the engine may be reduced, while also reducing average aerodynamic drag, and as such may increase fuel economy.

As one example, adjusting the active grille shutters into the final position includes adjusting the active grille shutters closer to the first position than second position as the difference in aerodynamic drag increases and adjusting the active grille shutters closer to the second position than the first position as the difference in the aerodynamic drag decreases. Thus, by opening the grille shutter by a smaller amount when the aerodynamic drag increases, the ECT may slowly increase while keeping aerodynamic losses at a lower level, thus increasing fuel economy. Additionally, by opening the grille shutter by a larger amount when the aerodynamic losses are smaller, the engine may be maintained at lower temperatures and hence ECT may be maintained at a lower level, thereby increasing engine oil life, and in some operating conditions increasing engine efficiency.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
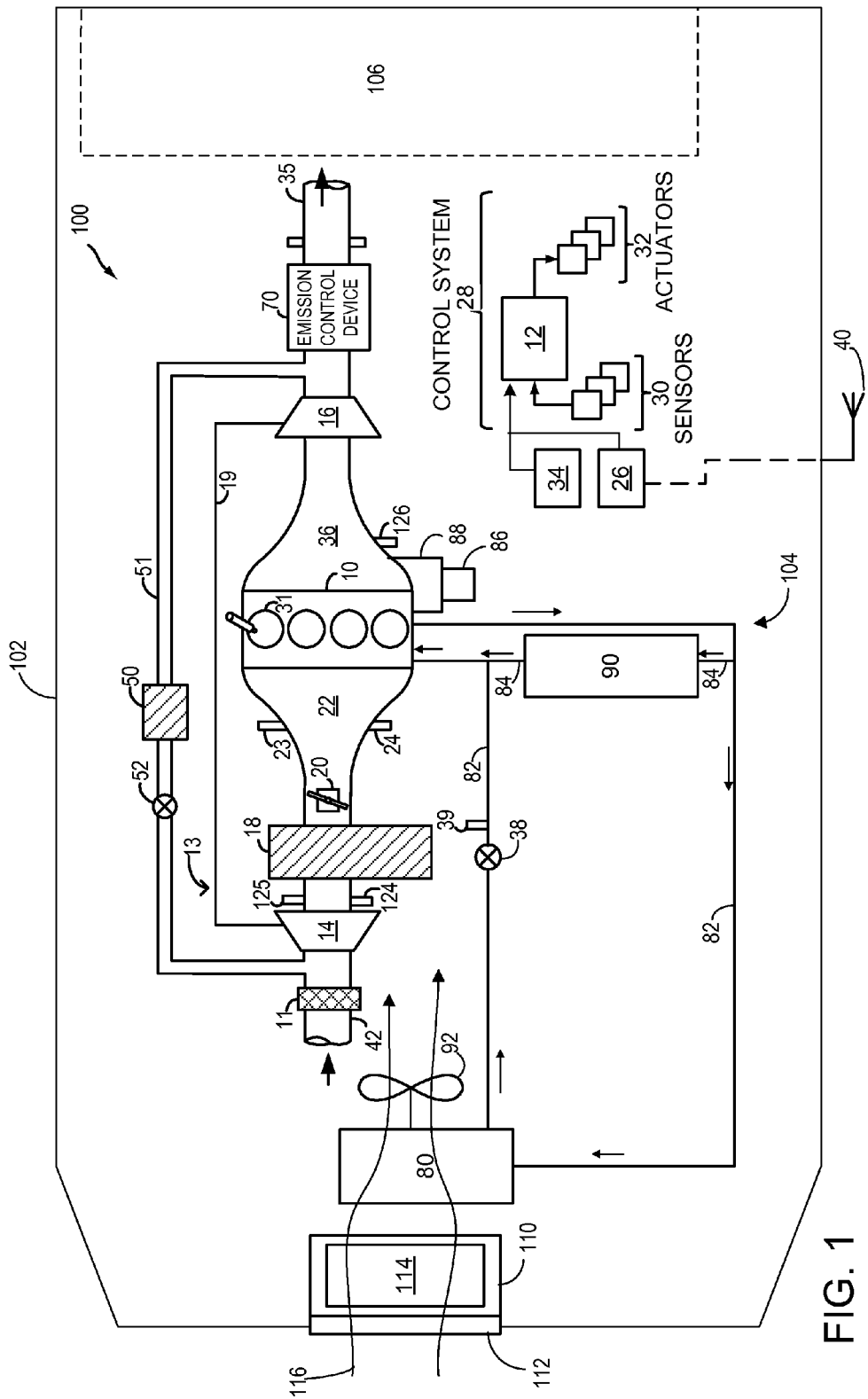
FIG. 1 shows a schematic diagram of a grille shutter system, engine, and associated components in a vehicle.
Figure 2:
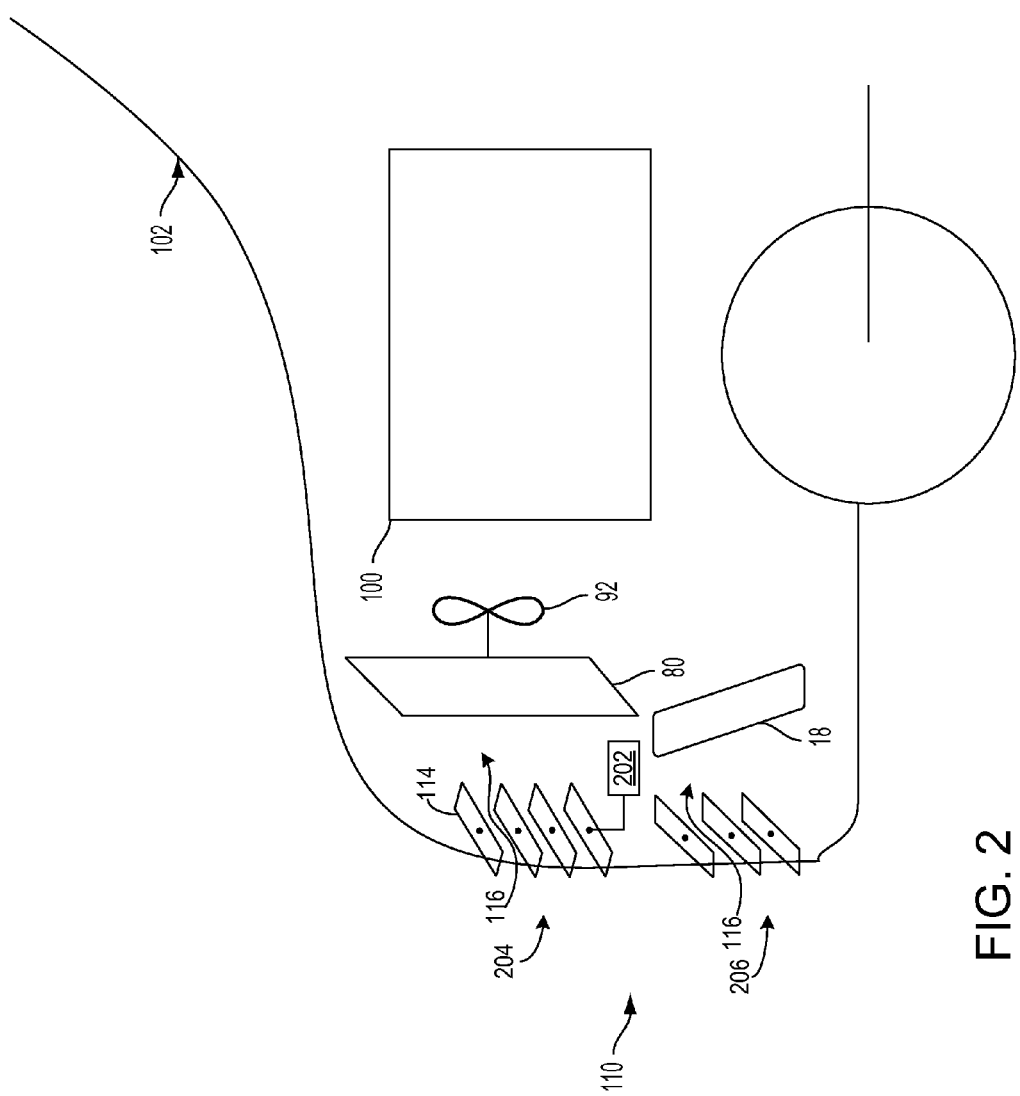
FIG. 2 shows an example of a charge air cooler (CAC), a radiator, and the engine location within a vehicle with respect to active grille shutters (AGS) and associated ambient airflow.

The following description relates to systems and methods for adjusting vehicle active grille shutters (AGS) to adjust cooling to an engine system, such as the engine system shown in FIG. 1. The AGS may be positioned at a grille of a front end of a vehicle, as shown at FIG. 2. The opening of the AGS may be adjusted based on engine operating conditions in order to increase or decrease cooling airflow to the engine. A controller may be configured to perform a routine, such as the routine of FIG. 3, to adjust the opening of the AGS between a first and a second opening based on a rate of change of an engine coolant temperature (ECT) and a difference in aerodynamic drag between the first and the second opening. Example grille shutter adjustments based on ECT and aerodynamic drag are shown at FIG. 4. In this way, by continuously adjusting the grille shutter opening based on the ECT and the aerodynamic drag, the efficiency of the engine operation may be increased and the fuel economy of the vehicle may also be increased.

FIG. 1 shows an example embodiment of a grille shutter system (e.g., active grille shutter system) 110 and an engine system 100, in a motor vehicle 102, illustrated schematically. Engine system 100 may be included in a vehicle such as a road vehicle, among other types of vehicles. While the example applications of engine system 100 will be described with reference to a vehicle, it should be appreciated that various types of engines and vehicle propulsion systems may be used, including passenger cars, trucks, etc.

In the depicted embodiment, engine 10 is a boosted engine coupled to a turbocharger 13 including a compressor 14 driven by a turbine 16. Specifically, fresh air is introduced along intake passage 42 into engine 10 via air cleaner 11 and flows to compressor 14. The compressor may be a suitable intake-air compressor, such as a motor-driven or driveshaft driven supercharger compressor. In the engine system 100, the compressor is shown as a turbocharger compressor mechanically coupled to turbine 16 via a shaft 19, the turbine 16 driven by expanding engine exhaust. In one embodiment, the compressor and turbine may be coupled within a twin scroll turbocharger. In another embodiment, the turbocharger may be a variable geometry turbocharger (VGT), where turbine geometry is actively varied as a function of engine speed and other operating conditions.

As shown in FIG. 1, compressor 14 is coupled, through charge air cooler (CAC) 18 to throttle valve (e.g., intake throttle) 20. The CAC may be an air-to-air or air-to-coolant heat exchanger, for example. Throttle valve 20 is coupled to engine intake manifold 22. From the compressor, the hot compressed air charge enters the inlet of the CAC 18, cools as it travels through the CAC, and then exits to pass through the throttle valve to the intake manifold. Ambient airflow 116 from outside the vehicle may enter engine 10 through a grille 112 at a vehicle front end and pass across the CAC, to aid in cooling the charge air. Condensate may form and accumulate in the CAC when the ambient air temperature decreases, or during humid or rainy weather conditions, where the charge air is cooled below the water dew point. When the charge air includes recirculated exhaust gasses, the condensate can become acidic and corrode the CAC housing. The corrosion can lead to leaks between the air charge, the atmosphere, and possibly the coolant in the case of water-to-air coolers. Additionally, condensate may collect at the bottom of the CAC, and then be drawn into the engine at once during acceleration (or tip-in) increasing the chance of engine misfire. In one example, cooling ambient airflow traveling to the CAC may be controlled by the grille shutter system 110 such that condensate formation and engine misfire events are reduced.

In the embodiment shown in FIG. 1, the pressure of the air charge within the intake manifold is sensed by manifold air pressure (MAP) sensor 24 and a boost pressure is sensed by boost pressure sensor 124. A compressor by-pass valve (not shown) may be coupled in series between the inlet and the outlet of compressor 14. The compressor by-pass valve may be a normally closed valve configured to open under selected operating conditions to relieve excess boost pressure. For example, the compressor by-pass valve may be opened during conditions of decreasing engine speed to avert compressor surge.

Intake manifold 22 is coupled to a series of combustion chambers 31 through a series of intake valves (not shown). Additional sensors such as manifold charge temperature (MCT) sensor 23 and air charge temperature sensor (ACT) 125 may be included to determine the temperature of intake air at the respective locations in the intake passage. In some examples, the MCT and the ACT sensors may be thermistors and the output of the thermistors may be used to determine the intake air temperature in the passage 42. The MCT sensor 23 may be positioned between the throttle 20 and the intake valves of the combustion chambers 31. The ACT sensor 125 may be located upstream of the CAC 18 as shown, however, in alternate embodiments, the ACT sensor 125 may be positioned upstream of compressor 14. The air temperature may be further used in conjunction with an engine coolant temperature to compute the amount of fuel that is delivered to the engine, for example. The combustion chambers are further coupled to exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold section may enable effluent from different combustion chambers to be directed to different locations in the engine system. Universal Exhaust Gas Oxygen (UEGO) sensor 126 is shown coupled to exhaust manifold 36 upstream of turbine 16. Alternatively, a two-state exhaust gas oxygen sensor may be substituted for UEGO sensor 126.

As shown in FIG. 1, exhaust from the one or more exhaust manifold sections is directed to turbine 16 to drive the turbine. When reduced turbine torque is desired, some exhaust may be directed instead through a waste gate (not shown), by-passing the turbine. The combined flow from the turbine and the waste gate then flows through emission control device 70. In general, one or more emission control devices 70 may include one or more exhaust after-treatment catalysts configured to catalytically treat the exhaust flow, and thereby reduce an amount of one or more substances in the exhaust flow.

All or part of the treated exhaust from emission control device 70 may be released into the atmosphere via exhaust conduit 35. Depending on operating conditions, however, some exhaust may be diverted instead to an exhaust gas recirculation (EGR) passage 51, through EGR cooler 50 and EGR valve 52, to the inlet of compressor 14. In this manner, the compressor is configured to admit exhaust tapped from downstream of turbine 16. The EGR valve 52 may be opened to admit a controlled amount of cooled exhaust gas to the compressor inlet for desirable combustion and emissions-control performance. In this way, engine system 100 is adapted to provide external, low-pressure (LP) EGR. The rotation of the compressor, in addition to the relatively long LP EGR flow path in engine system 100, provides excellent homogenization of the exhaust gas into the intake air charge. Further, the disposition of EGR take-off and mixing points provides effective cooling of the exhaust gas for increased available EGR mass and improved performance. In other embodiments, the EGR system may be a high pressure EGR system with EGR passage 51 connecting from upstream of the turbine 16 to downstream of the compressor 14. In some embodiments, the MCT sensor 23 may be positioned to determine the manifold charge temperature, and may include air and exhaust recirculated through the EGR passage 51.

Motor vehicle 102 further includes a cooling system 104 that circulates coolant through internal combustion engine 10 to absorb waste heat and distributes the heated coolant to radiator 80 and/or heater core 90 via coolant lines 82 and 84, respectively. In particular, FIG. 1 shows cooling system 104 coupled to engine 10 and circulating engine coolant from engine 10 to radiator 80 via engine-driven water pump 86, and back to engine 10 via coolant line 82. Engine-driven water pump 86 may be coupled to the engine via front end accessory drive (FEAD) 88, and rotated proportionally to engine speed via belt, chain, etc. Specifically, engine-driven water pump 86 circulates coolant through passages in the engine block, head, etc., to absorb engine heat, which is then transferred via the radiator 80 to ambient air. In an example where engine-driven water pump 86 is a centrifugal pump, the pressure (and resulting flow) produced may be proportional to the crankshaft speed, which in the example of FIG. 1, is directly proportional to engine speed. In another example, a motor-controlled pump may be used that can be adjusted independently of engine rotation. The temperature of the coolant (e.g., engine coolant temperature, ECT) may be regulated by a thermostat valve 38, located in the cooling line 82, which may be kept closed until the coolant reaches a threshold temperature. In some examples, the ECT may be determined based on the thermostat valve opening. In other examples, a temperature sensor 39 may be positioned in the cooling line to measure ECT. As such, the temperature sensor 39 may be positioned upstream or downstream of the thermostat valve 38.

Engine system 100 may include an electric fan 92 for directing cooling airflow toward the CAC 18, engine cooling system 104, or other engine system components. In some embodiments, electric fan 92 may be an engine cooling fan. The engine cooling fan may be coupled to radiator 80 in order to maintain airflow through radiator 80 when vehicle 102 is moving slowly or stopped while the engine is running. Fan rotation speed or direction may be controlled by a controller 12. In one example, a grille shutter system 110 may adjust the positions of the grille shutters 114 to allow ambient air entering the vehicle through a grille 112 by opening or closing the grille shutters 114. Grille shutters 114 located in front of the CAC may be operated adaptively and/or continuously adjusted to cool the CAC.

Coolant may flow through coolant line 82, as described above, and/or through coolant line 84 to heater core 90 where the heat may be transferred to passenger compartment 106, and the coolant flows back to engine 10. In some examples, engine-driven water pump 86 may operate to circulate the coolant through both coolant lines 82 and 84.

FIG. 1 further shows a control system 28. Control system 28 may be communicatively coupled to various components of engine system 100 to carry out the control routines and actions described herein. For example, as shown in FIG. 1, control system 28 may include an electronic digital controller 12. Controller 12 may be a microcomputer, including a microprocessor unit, input/output ports, an electronic storage medium for executable programs and calibration values, random access memory, keep alive memory, and a data bus. As depicted, controller 12 may receive input from a plurality of sensors 30, which may include user inputs and/or sensors (such as transmission gear position, gas pedal input (e.g., pedal position), brake input, transmission selector position, vehicle speed, engine speed, mass airflow through the engine, boost pressure, ambient temperature, ambient humidity, intake air temperature, fan speed, etc.), cooling system sensors (such as ECT sensor 39, fan speed, passenger compartment temperature, ambient humidity, etc.), CAC 18 sensors (such as CAC inlet air temperature, ACT sensor 125 and pressure, CAC outlet air temperature, MCT sensor 23 and pressure, etc.), and others. In addition, controller 12 may receive data from a GPS 34 and/or an in-vehicle communications and entertainment system 26 of vehicle 102. In one embodiment, based on the rate of change of ECT, controller may determine a future ECT and accordingly estimate first and a second grille shutter openings. Aerodynamic drag may be estimated at the two grille shutter positions, and the controller may set the final grille shutter position (between the first and the second grille shutter position) based on the estimated aerodynamic drag, as explained further below with reference to FIG. 3.

Furthermore, controller 12 may communicate with various actuators 32, which may include engine actuators (such as fuel injectors, an electronically controlled intake air throttle plate, spark plugs, etc.), cooling system actuators (such as air handling vents and/or diverter valves in the passenger compartment climate control system, etc.), the active grille shutters 14, and others. In some examples, the storage medium may be programmed with computer readable data representing instructions executable by the processor for performing the methods described below as well as other variants that are anticipated but not specifically listed.

As noted herein, the amount of waste heat transferred to the coolant from the engine may vary with operating conditions, thereby affecting the amount of heat transferred to the airflows. For example, as engine output torque, or fuel flow, is reduced, the amount of waste heat generated may be proportionally reduced.

The grille 112 of the motor vehicle 102 provides an opening (e.g., a grille opening, a bumper opening, etc.) for receiving ambient airflow 116 through or near the front end of the vehicle and into the engine compartment. Such ambient airflow 116 may then be utilized by radiator 80, electric fan 92, and other components to keep the engine and/or transmission cool. The grille shutter system 110 may include active grille shutters (AGS) 114 configured to adjust the amount of airflow received through grille 112. The AGS 114 may also be referred to as automated grille shutters or grille shutters henceforth. Further, the ambient airflow 116 may reject heat from the vehicle air conditioning system and can improve performance of turbo-charged/super-charged engines that are equipped with CAC 18 that reduces the temperature of the air that goes into the intake manifold/engine. In one example, the electric fan 92 may be adjusted to further increase or decrease the airflow to the engine components. When ECT increases, typically the AGS may be opened to increase the amount of airflow from the outside into the vehicle to cool down the ECT, for example. Opening the AGS fully may effectively cool down the ECT and increase efficient engine operation and engine life, but may cause the ECT to overcool (e.g., cool more than necessary for efficient engine operation and engine life). In addition, opening the grille shutters fully may also affect the aerodynamics of the vehicle. Aerodynamic drag is the mechanical force generated when the vehicle moves through a fluid (air or liquid). By partially opening the grille shutters, it may be possible to reduce aerodynamic drag of the vehicle, but that may conversely affect the ECT since the ECT may not be sufficiently reduced to provide adequate engine cooling. This may cause the ECT to increase and the engine coolant to overheat (e.g., become hotter than desired for efficient engine operation and engine life). The inventors have realized the issue with overheating and overcooling of the engine coolant, and have devised a method for adjusting the AGS positioned at a front end of a vehicle actively into a final position based on a rate of change of ECT and a difference in aerodynamic drag. By adjusting the AGS based on a rate of change in ECT, instead of based on a current ECT, overheating or overcooling of engine coolant to levels greater or lower than necessary to maintain the engine at a desired operating temperature may be reduced. As a result, the AGS may be adjusted more precisely based on a predicted (e.g., future) ECT based on the rate of change in ECT, and other variables such as the change in ECT, engine power, air density, air velocity, air temp, air humidity. This may allow the AGS to be adjusted to less extreme positions (e.g., adjusted into positions with smaller amounts of opening or adjusted by a smaller amount as ECT changes), thereby reducing vehicle drag. In this way, by adaptively adjusting the grille shutter opening based on the thermal cooling requirements of the engine and the estimated aerodynamic drag at various grille shutter positions, overheating or overcooling of the engine may be reduced, and the grill shutter may be at a smaller average opening during the drive trip, so that fuel economy and engine efficiency may be increased.

FIG. 2 shows an example of the CAC 18, radiator 80, electric fan 92, and engine system 100 locations within a vehicle 102 with respect to the grille shutter system 110 and associated ambient airflow 116. Other under hood components (fuel system, batteries, etc.) may benefit from the cooling airflow as well. Thus, grille shutter system 110 may assist cooling system 104 in cooling internal combustion engine 10. In one example, as shown in FIG. 2, grille shutter system 110 may be a dual active grille shutter system comprising two groups of one or more AGS 114 configured to adjust the amount of airflow received through grille 112. In another example, the grille shutter system 110 may be an active grille shutter system comprising only one group of one or more AGS 114.

AGS 114 may cover a front region of the vehicle spanning from just below the hood to the bottom of the bumper, for example. By covering the vehicle front end, drag is reduced and entry of external cooling air to the radiator 80 and CAC 18 is reduced. In some embodiments, AGS 114 may be actively or automatically moved in coordination by the controller. In other embodiments, grille shutters may be divided into groups and the controller may adjust opening/closing of each region independently. For example, a first group of AGS 204 may be positioned in front of the radiator and a second group of AGS 206 may be positioned in front of the CAC 18.

As shown in FIG. 2, the first group of AGS 204 is positioned vertically above, with respect to a surface on which vehicle 102 sits, the second group of AGS 206. As such, the first group of grille shutters 204 may be referred to as the upper grille shutters and the second group of grille shutters 206 may be referred to as the lower grille shutters. An amount of opening of the first group of grille shutters 204 controls an amount of ambient airflow 116 traveling to the radiator 80 and an amount of opening of the second group of grille shutters 206 controls an amount of ambient airflow traveling to the CAC 18. As such, the upper grille shutters 204 may largely affect vehicle drag and engine cooling while the lower grille shutters 206 may affect CAC cooling. In some examples, the grille shutters 204 and 206 may be independently adjusted depending on the cooling needs. For example, in some situations where CAC may require more cooling than the engine, the lower grille shutters 206 may be opened by a larger amount than the upper grille shutters 204. Conversely, when the engine may require more cooling than the CAC, the upper grille shutters 204 may be opened by a larger amount compared to the lower grille shutters 206. In such examples, the controller 12 may adjust the positions of the grille shutters 204 and 206 independently according to the cooling needs of the engine and the CAC. In other examples, the controller 12 may adjust both the grille shutters 204 and 206 together, either synchronously or asynchronously further depending on the cooling requirements of the engine and/or the CAC.

In some examples, each group of grille shutters may contain the same number of grille shutters 114, while in other examples one group of grille shutters may contain more than the other. In one embodiment, the first group of grille shutters 204 may contain multiple grille shutters, while the second group of grille shutters 206 contains one grille shutter. In an alternate embodiment, the first group of grille shutters may only contain one grille shutter, while the second group of grille shutters contains multiple grille shutters. In alternate embodiments, all the grille shutters 114 may be included as one group and an amount of opening of the one group of grille shutters 114 may affect vehicle drag, engine cooling, and CAC cooling.

Grille shutters 114 are moveable between an opened position and a closed position, and may be maintained at either position or a plurality of intermediate positions thereof. In other words, opening of grille shutters 114 may be adjusted such that grille shutters 114 are opened partially, closed partially, or cycled between an open position and a closed position to provide airflow for cooling engine compartment components. The open position may be referred to as a maximal amount of opening (or maximal percentage opening) such that the grille shutters are fully open. An amount of opening of the grille shutters 114 or group of grille shutters (e.g., first group of grille shutters 204 or second group of grille shutters 206) may be denoted by a percentage. For example, when the grille shutters are half-way between an opened and closed position, the grille shutters may be 50% open. When the grille shutters are opened to the maximal percentage opening (e.g., an upper threshold amount of opening), the grille shutters may be 100% open.

The grille shutters 114 (e.g., upper grille shutters) may be actuated by a motor 202. Motor 202 may be operatively coupled to the control system 28. As an example, controller 12 may be communicably connected to grille shutter system 110, and may have instructions stored thereon to adjust opening of grille shutters 114 based on the engine cooling requirements and estimated aerodynamic drag. Controller 12 may send signals for adjusting the grille shutter system 110 to motor 202. These signals may include commands to increase or decrease the opening of the upper grille shutters. For example, controller 12 may command the motor 202 to open the upper grille shutters to 30% open. Motor 202 may be coupled to one or more grille shutters 114. For example, motor 202 may be coupled to a first grille shutter 114, the first grille shutter mechanically linked to the remaining grille shutters 114. In another example, motor 202 may be coupled to each grille shutter 114 or each group of grille shutters. Further, in some examples, the grille shutter system 110 may include more than one motor for controller more than one group or more than one individual grille shutter.

Figure 3:
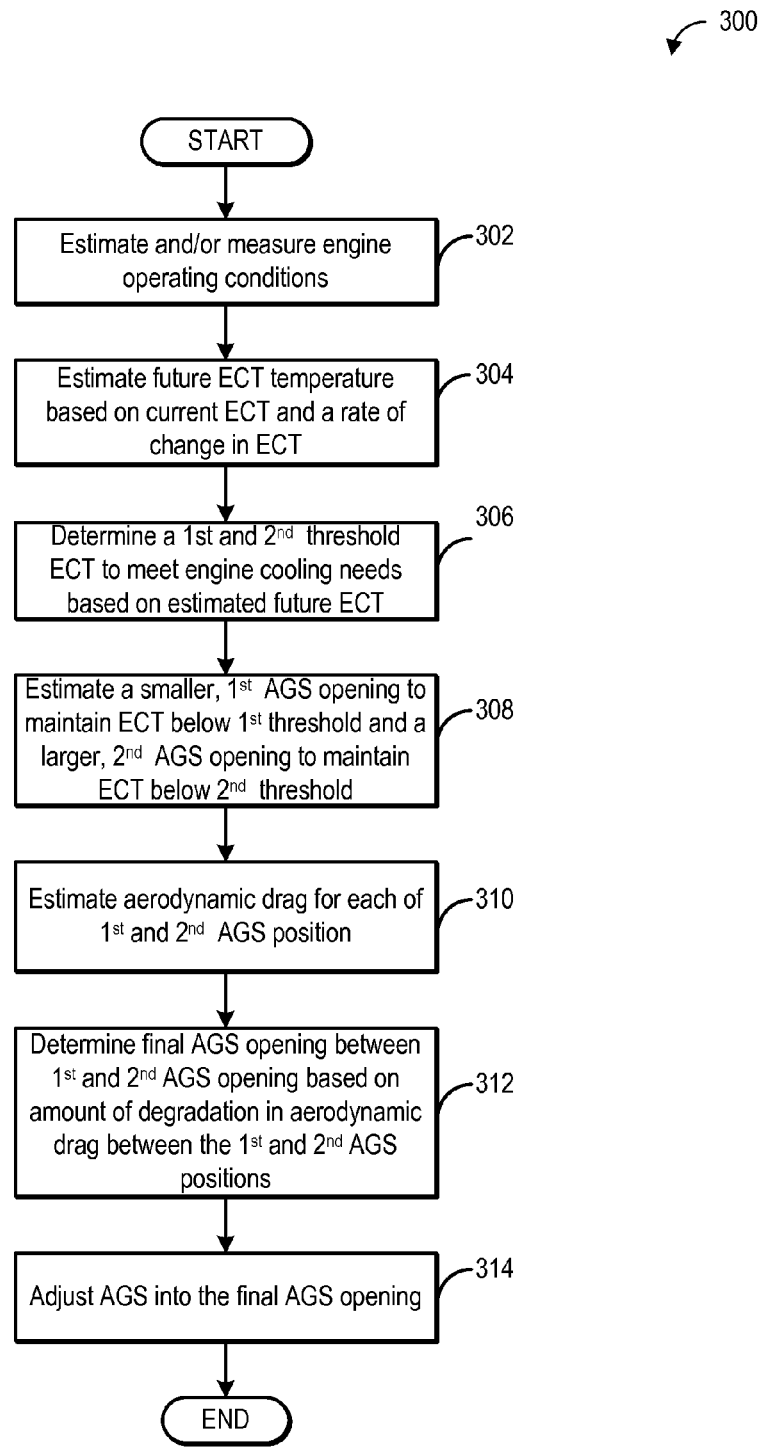
FIG. 3 shows a high level flow chart depicting a method for adjusting a position of the AGS based on a rate of change of engine coolant temperature (ECT) and an aerodynamic drag.
Figure 4:
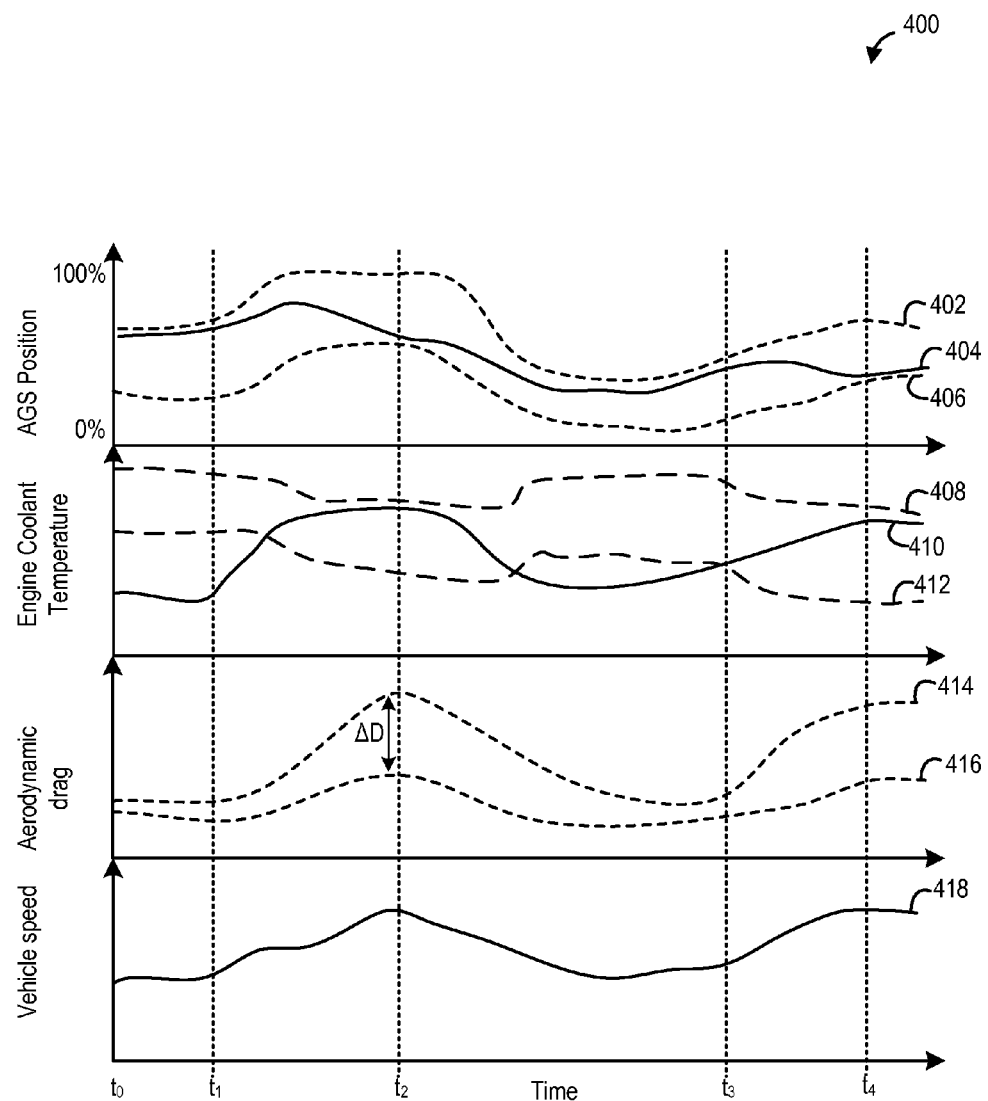
FIG. 4 shows a graphical example of adjusting an AGS opening based on the ECT and the aerodynamic drag.

In order to reduce overheating and overcooling of the engine coolant largely due to the slow response of powertrain mass, the controller 12 may carry out a method 300, as shown in FIG. 3 to estimate a future engine coolant temperature (ECT) based on the current ECT and the rate of change of ECT (e.g., how quickly the ECT is increasing or decreasing or whether the ECT is relatively constant). The controller 12 may then estimate a first and a second grille shutter opening based on ECT thresholds that are based on the rate of change in the ECT. The controller 12 may further determine aerodynamic drag at the two grille shutter positions, and may adjust the grille shutter opening to a final position at or between the first and the second grille shutter positions based on the aerodynamic drag at these positions.

FIG. 3 shows a method 300 for adjusting a position of active grille shutters of a vehicle (such as the active grille shutters 114 of grille shutter system 110 shown in FIGS. 1-2) based on a rate of change of engine coolant temperature (ECT) (e.g., a temperature of coolant circulating through the engine and an engine coolant loop including a radiator) and an estimate of aerodynamic drag at one or more grille shutter positions (e.g., at one or more percentage openings of the grille shutters). The adjusting the grille shutters may be further based on engine power, a change in ECT, air density, air velocity, air temperature and air humidity of engine intake air. An electronic controller (such as controller 12 shown in FIG. 1) receives signals from the various sensors of the engine and vehicle (e.g., such as the sensors shown in FIGS. 1 and 2) and employs the various actuators of the engine and vehicle (e.g., such as the actuators shown in FIGS. 1 and 2) to adjust engine operation based on the received signals and instructions stored on a memory of the controller. Instructions for carrying out method 300 may be executed by the controller based on instructions stored on the memory of the controller and in conjunction with signals received from sensors of the engine system, such as the sensors described above with reference to FIGS. 1 and 2. The controller may employ engine actuators of the engine system, such as a motor coupled to the grille shutters, to adjust engine operation, according to the methods described below.

At 302, method 300 includes estimating and/or measuring engine operating conditions. Engine operating conditions determined may include, for example, vehicle speed, engine coolant temperature, engine air mass, ambient air temperature, wind speed, barometric pressure, air charge temperature, manifold charge temperature, etc. Method 300 proceeds to 304. At 304, a future ECT is estimated based on a rate of change in the ECT. As one example, the rate of change in ECT may be based on an instantaneous ECT or an average ECT over a duration and compared to a previous average ECR over the duration. The powertrain mass of a vehicle may respond slowly to heating and cooling of the engine. As a result of this thermal inertia, the ECT may undergo a phase delayed overshoot. A controller (e.g., controller 12 as shown in FIG. 1) may estimate a future ECT based on one or more of the current ECT and the rate at which the ECT is changing (either increasing or decreasing or remaining steady). For example, the current ECT may be measured by one or more ECT sensors. In another example, the current ECT may be estimated based on alternate engine operating parameters or temperatures. In some examples, if the vehicle is a hybrid vehicle and the engine shuts off, the rate of change of ECT may be estimated based on an under hood temperature. For example, if the under hood temperature is not above a threshold temperature, then the controller may close the grille shutters completely (e.g., 0% opening). The controller may either determine the under hood temperature based on the output of one or more temperature sensors, or may use a look up table to determine the ECT change as a function of the under hood temperature when the engine is shut off.

After determining the rate of change in the ECT and/or the future ECT, method 300 proceeds to 306 where a first engine coolant temperature (ECT) threshold and a second engine coolant temperature (ECT) threshold are estimated based on the rate of change of the engine coolant temperature and/or the estimated future ECT. The first and second ECT thresholds may be further based on temperature thresholds for each of an engine, charge air cooler, and air conditioning system of a vehicle in which the engine is installed. For example, the first and the second ECT thresholds may be determined based on one or more of a current engine coolant temperature, a future engine coolant temperature, air charge temperature, manifold charge temperature, and air conditioning system temperature. The first ECT threshold may be an upper ECT threshold that is greater than the second ECT threshold (which may be referred to herein as a lower ECT threshold). More specifically, in one example, determining the upper, first ECT threshold may include looking up (e.g., in a look-up table stored in a memory of the controller) an upper threshold ECT for maintaining the engine below an upper threshold temperature and an upper threshold ECT for maintaining a temperature of the air conditioning system below an upper threshold temperature. The upper threshold ECTs for the engine and air conditioning system may each be based on current engine operating conditions, including current demands on the engine and air conditioning system. A minimum value between the upper threshold ECT for the engine and the upper threshold ECT for the air conditioning may then be chosen by the controller as an upper engine and A/C ECT threshold. The method may further include determining an upper air temperature ECT threshold based on an upper threshold air charge temperature (e.g., a temperature of the charge air upstream of a throttle) and upper threshold manifold charge temperature (e.g., a temperature of the charge air in the engine intake manifold) for reducing borderline spark inefficiency and providing cooling to a charge air cooler (such as the CAC 18 shown in FIGS. 1-2). The controller may then determine the first ECT threshold by choosing the minimum value between the upper engine A/C ECT threshold and the upper air temperature ECT threshold.

Similarly, determining the lower, second ECT threshold may include looking up (e.g., in the look-up table stored in a memory of the controller) a moderate threshold ECT for maintaining the engine below a moderate threshold temperature and a moderate threshold ECT for maintaining the temperature of the air conditioning system below a moderate threshold temperature. The moderate threshold ECTs for the engine and air conditioning system may each be based on current engine operating conditions, including current demands on the engine and air condition system. A minimum value between the moderate threshold ECT for the engine and the moderate threshold ECT for the air conditioning may then be chosen by the controller as a moderate engine and A/C ECT threshold. The method may further include determining a moderate air temperature ECT threshold based on a moderate threshold air charge temperature (e.g., a temperature of the charge air upstream of a throttle) and moderate threshold manifold charge temperature (e.g., a temperature of the charge air in the engine intake manifold) for reducing borderline spark inefficiency and providing cooling to a charge air cooler (such as the CAC 18 shown in FIGS. 1-2). The controller may then determine the second ECT threshold by choosing the minimum value between the moderate engine A/C ECT threshold and the moderate air temperature ECT threshold.

As one example, the second ECT threshold may be a threshold lower than the first ECT threshold. For example, the second ECT threshold may be 220 F, and the first ECT threshold may be 250 F. As used herein, the second ECT threshold is a moderate threshold that is lower than the upper thresholds explained above (e.g., where the upper thresholds are maximal values that are pre-set or based on engine operating conditions and upper cooling thresholds of the engine). The moderate or second ECT threshold may be the desired average maximum temperature over the life of the engine, so therefore is a lower temperature than the first threshold which may be an absolute maximum threshold (e.g., moderate threshold may be 30 degrees less than the absolute maximum).

As one example, the first and the second engine coolant temperature thresholds decrease when the engine coolant temperature is increasing and as the rate of change of the engine coolant temperature increases. As another example, the first and second engine coolant temperature thresholds increase when the engine coolant temperature is decreasing and as the rate of change in the engine coolant temperature increases.

Method 300 then proceeds to 308 where a smaller, first AGS opening to maintain ECT below the upper, first ECT threshold (as determined at 306) is estimated. In addition, a larger, second AGS opening (e.g., higher percentage opening than the first AGS opening) to maintain ECT below the lower, second ECT threshold (as determined at 306) is estimated at 308. In this way, the first position is a grille shutter (or AGS) opening that maintains the engine coolant temperature below the first engine coolant temperature threshold and the second position is a grille shutter opening that maintains the engine coolant temperature below the second engine coolant temperature threshold. The first position may be estimated based on a difference between the future (e.g., predicted) engine coolant temperature, where the predicted engine coolant temperature is based on the rate of change of the engine coolant temperature, and the first engine coolant temperature threshold. The first position may be further based on one or more of engine power, air density, air velocity (e.g., velocity of air flowing into the vehicle via the grille shutters), air temperature, and air humidity. Similarly, the second position may be estimated based on a difference between the predicted engine coolant temperature and the second engine coolant temperature threshold and one or more of engine power, air density, air velocity, air temperature, and air humidity.

After determining the first and second AGS openings (e.g., percentage openings or positions) for the first and second ECT thresholds, method 300 proceeds to 310 to determine an aerodynamic drag value for each of the first and second AGS positions. The aerodynamic drag is the mechanical force generated by the vehicle moving thorough air (outside of the vehicle) and is generated due to the difference in velocities between the vehicle and the air. The aerodynamic drag is generated when there is relative air motion between the vehicle and air. As such, when the vehicle is stationary, there is little to no aerodynamic drag. However, when the vehicle is in motion, and air enters through the AGS, the underhood obstructions, and the change in airflow at the vehicle surfaces cause an increase in resistive force on the vehicle resulting in increased aerodynamic drag. The increase in aerodynamic drag directly reduces fuel economy. Thus, the controller may estimate the aerodynamic drag for each of the first position and the second position based on a percentage opening at each of the first position and the second position, and one or more of an air density, vehicle speed, wind speed, and air temperature. In some examples, the aerodynamic drag for each of the first position and the second position is estimate based on the percentage opening at each of the first position and the second position, respectively, and each of the air density, vehicle speed, wind speed and air temperature (all of which may be estimated and/or measured values). Thus, the amount of aerodynamic drag on the vehicle depends on the amount of AGS opening, where a larger percentage opening (e.g., when the grille shutters are open by a larger amount) creates a larger aerodynamic vehicle drag and a smaller percentage opening creates a smaller aerodynamic vehicle drag.

Once the aerodynamic drag for each of the first and second AGS opening is determined, method 300 proceeds to 312 to determine a final AGS opening based on the amount of degradation in aerodynamic drag between the first and second AGS positions. For example, the controller may estimate a percentage degradation in aerodynamic drag between the smaller, first AGS opening and the larger, second AGS opening by calculating the ratio of the difference in the aerodynamic drag at the two AGS openings (e.g., the first and second AGS openings) to the aerodynamic drag at the smaller, first AGS opening. The controller may then determine an AGS ratio as a function of the percentage degradation in aerodynamic drag. The function may be calibrated so that if a difference in the degradation of aerodynamic drag is less than a threshold, then the final AGS position is set closer to the larger, second AGS opening in order to provide more cooling to the engine. The function may also be calibrated so that if the difference in the degradation of aerodynamic drag is greater than the threshold (or greater than a larger, second threshold), then the final AGS position is set closer to the smaller, first AGS opening to allow ECT to climb to a level near an upper threshold and thereby increase vehicle fuel economy. The controller may then determine the final AGS opening by interpolating between the smaller, first AGS opening, the AGS ratio, and the larger, second AGS opening. In this way, the final AGS opening may be one of the first AGS opening, the second AGS opening, or an opening amount between the first and second AGS openings.

Method 300 then proceeds to 314 where the AGS are adjusted to the final AGS opening or position. For example, the controller may continuously update (or in an alternative example, adaptively learn) the percentage aerodynamic drag and determine the final AGS position based on an amount of degradation in aerodynamic drag between the second position and the first position. For example, if the difference in the aerodynamic degradation is relatively small (e.g., below a threshold), then the controller may set the AGS opening closer to the larger opening to give more cooling to the engine. Conversely, if the difference in the aerodynamic loss is relatively large (e.g., above a threshold), then the controller may set the AGS opening closer to the smaller opening that will reduce further loss and will ensure a slower rate of rise in ECT. Further, the method at 314 may include actuating an actuator coupled to the AGS (e.g., such as a motor similar to motor 202 shown in FIG. 2) to adjust the AGS into the determined final AGS opening. Method 300 then ends.

In this way, the method includes adjusting active grille shutters (AGS) positioned at a front end of a vehicle into a final position at or between a first position having a smaller amount of opening and a second position having a larger amount of opening based on a rate of change of an engine coolant temperature and a difference in aerodynamic drag between the first and second positions. Adjusting the AGS into the final position may include adjusting the AGS closer to the first position than the second position as the difference in aerodynamic drag increases. As another example, adjusting the AGS into the final position includes adjusting the AGS closer to the second position than the first position as the difference in aerodynamic drag decreases. In one example, the final position is based on an amount of degradation in aerodynamic drag between the second position and the first position. In addition, the first position may be a grille shutter opening that maintains the engine coolant temperature below the first engine coolant temperature threshold and the second position may be a grille shutter opening that maintains the engine coolant temperature below the second engine coolant temperature threshold. The technical effect of adjusting the grille shutters based on the estimated degradation in aerodynamic drag, is that the grille shutter positions is adaptively altered, thereby reducing degradation in engine operation and further reducing losses in engine efficiency. Furthermore, the ECT may be better maintained and overheating and overcooling of the ECT may be reduced.

Turning now to FIG. 4, map 400 shows an example relationship between an AGS opening, an ECT and aerodynamic drag of a vehicle due to the AGS opening. Specifically, MAP 400 shows example adjustments to the AGS position and changes in the ECT thresholds based on changes in the engine operating conditions and according to the method shown in FIG. 3. Based on lower, second engine cooling and air conditioning system requirements (as described above with reference to FIG. 3), a controller may determine a lower, second ECT threshold (indicated by plot 412). Similarly, based on upper, first engine cooling and air conditioning system requirements, the controller may determine a higher, first (or upper) ECT threshold (indicated by plot 408). In some examples, the lower and the upper ECT thresholds may be further based on an air charge temperature and manifold charge temperature. In addition, the controller may determine a future ECT based on a rate of rise of ECT. Based on the engine cooling needs (i.e., based on ECT thresholds and ECT future), a smaller, first AGS position and a larger, second AGS position may be determined. The first AGS position is indicated by plot 406, while the second AGS position is indicated by plot 402. In some examples, the first AGS position may be based on a difference between the future ECT and the upper ECT threshold (408), while the second AGS position may be based on the difference between the future ECT and the lower ECT threshold (412). The first and the second AGS positions may further depend on one or more of engine power, air density, air velocity, air temperature, air humidity, etc. If the AGS opening is adjusted such that it stays within the first and the second AGS positions, the engine coolant may be maintained better without overheating or overcooling. Based on the determined first and second AGS positions, the controller may determine a corresponding aerodynamic drag value by performing a routine as described in FIG. 3, for example. The estimated aerodynamic drag corresponding to the first AGS opening is indicated by plot 416, and the estimated aerodynamic drag corresponding to the second AGS opening is indicated by plot 414. As such, the first AGS position is smaller than the second AGS position, therefore, the aerodynamic drag corresponding to the first AGS position is smaller than the aerodynamic drag corresponding to the second AGS position. A final grille shutter position (as shown at plot 404) may be selected at or between the first and second AGS positions base on a difference in aerodynamic drag between the first and second AGS positions. As described above, the first ECT threshold may be an upper ECT threshold and the second ECT threshold may be a threshold that is a threshold amount smaller than the first ECT threshold. The vehicle speed in shown at plot 418. For each plot, time is depicted along the x (horizontal) axis while values of each respective parameter are depicted along the y (vertical) axis. The vehicle speed may be one of the additional engine operating conditions which may affect the aerodynamic drag. In alternate embodiments, additional or alternative engine operating conditions, such as ambient air temperature and barometric pressure, may be used to determine aerodynamic drag.

At $t_0$, the vehicle speed is relatively stable (plot 418), and the engine coolant temperature is relatively stable (e.g., not increasing or decreasing) (plot 410).

Between $t_0$ and $t_1$, the amount of degradation in aerodynamic drag (e.g., corresponding to the difference in aerodynamic drag between the first and second AGS positions) is relatively small (e.g., below a threshold difference). The degradation in aerodynamic drag may be estimated as the ratio of the difference in aerodynamic drag at the first and the second AGS opening to the aerodynamic drag at the first AGS opening. In other words, during a time between $t_0$ and $t_1$, when the difference in the aerodynamic drag corresponding to the second and first AGS positions (as indicated by $\Delta D$ in map 400) is relatively small (e.g., below a drag difference threshold), the amount of degradation in the aerodynamic drag may be determined to be relatively small (e.g., below a threshold), and the final AGS position may be adjusted closer to the larger, second opening (plot 402), as indicated at 404. In this way, by adjusting the AGS opening to a position closer to the larger, second position than the smaller, first position when the amount of degradation due to aerodynamic drag is below a threshold level, the engine coolant may be cooled at a higher rate and/or by a greater amount and the ECT may be maintained below the first and second ECT thresholds, as indicated by plot 410. This may increase engine cooling, thereby increasing engine efficiency and engine life.

Between $t_1$ and $t_2$, the vehicle speed begins to increase (plot 418) and ECT also begins to rise, as indicated by plot 410. Based on the engine and/or air conditioning system cooling requirements described above, the controller may adaptively learn and determine the lower and upper ECT threshold as indicated by plots 408 and 412, and further determine the first and second AGS positions as indicated by plots 406 and 402, respectively. The controller may further determine the aerodynamic drag at the first and second AGS positions as explained earlier. However, between $t_1$ and $t_2$, the difference in aerodynamic drag $\Delta D$ between the first and second AGS position increases as indicated by plots 414 and 416. The controller may adaptively (or continuously) change the final AGS position based on the difference in drag between the first and second AGS position, as indicated by plot 404. As the difference (and the amount of degradation in drag) between the first and second AGS positions increases (and thus the fuel economy penalty of having the AGS in the larger second position rather than the smaller first position increases), the final AGS position may be adjusted to a position closer to the smaller first position than the larger second position. As a result, vehicle drag may be reduced and fuel economy may be increased. However, when the final AGS position is closer to the first position than the second position, less cooling may be provided to the engine and thus the ECT may rise slowly towards the upper threshold 408, as indicated by plot 410.

Between $t_2$ and $t_3$, the vehicle speed begins to decrease (plot 418) and the ECT also begins to decrease (plot 410). As explained above, the controller may adaptively learn and determine the lower and upper ECT thresholds and further determine the first and second AGS positions. The controller may further determine the aerodynamic drag at the first and second AGS positions, and accordingly compute the amount of degradation. Between $t_2$ and $t_3$, the difference in aerodynamic drag $\Delta D$ between the first and second AGS position decreases as indicated by plots 414 and 416. The controller may adaptively change the final AGS position based on the difference in drag between the first and second AGS position, as indicated by plot 404. As the difference (and the amount of degradation in drag) between the first and second AGS positions decreases, the final AGS position may be adjusted to a position closer to the larger, second position (plot 402) than the smaller, first position (plot 406). As a result, engine coolant may be cooled at a higher rate and/or by a greater amount and the ECT may be maintained below the first and second ECT thresholds, as indicated by plot 410. Adjusting the AGS into the final position may include actuating a motor coupled to the AGS to increase a percentage opening of the AGS as a difference in aerodynamic drag between the first and second positions decreases.

Between $t_3$ and $t_4$, the vehicle speed begins to increase (plot 418). As described earlier, the controller may adaptively learn and determine the lower (plot 412) and upper (plot 408) ECT threshold based on the engine and/or air conditioning system cooling requirements. The controller may further determine the first and second AGS positions as indicated by plots 406 and 402, respectively. The controller may further determine the aerodynamic drag at the first and second AGS positions as explained earlier. However, between $t_3$ and $t_4$, the difference in aerodynamic drag $\Delta D$ between the first and second AGS position increases as indicated by the distance between plots 414 and 416. The controller may adaptively change the final AGS position based on the difference in drag between the first and second AGS position, as indicated by plot 404. As the difference (and the amount of degradation in drag) between the first and second AGS positions increases, the final AGS position may be adjusted between the first and the second AGS position, to a position that is closer to the first position (plot 406) than the second position (plot 402). In this way, the AGS are adjusted to a smaller percentage opening, thereby reducing vehicle drag and increasing fuel economy. As a result, cooling provided to the engine may be reduced.

It may be appreciated that the positions of the AGS explained above and shown in FIG. 4 are adaptively changed by the controller and do not represent discrete AGS positions. The technical effect of adjusting the AGS position closer to the first position when the amount of degradation in aerodynamic drag between the first and second AGS positions is relatively large is to reduce vehicle drag and increase vehicle fuel economy. The technical effect of adjusting the AGS position closer to the second position than the first position when the amount of degradation in aerodynamic drag between the first and second AGS positions is relatively small is to provide increased cooling to the engine, and hence maintain ECT at a lower level.

The systems described herein and with regard to FIGS. 1 and 2 along with the methods described herein and with regard to FIG. 3 may enable one or more systems and one or more methods. In one example, a method for a vehicle is provided, the method including determining a smaller, first position and a larger, second position of active grille shutters positioned at a front end of a vehicle based on a rate of change in engine coolant temperature. In such an example, during a first condition, the AGS may be adjusted into a third position that is closer to the first than the second position. Furthermore, during a second condition, the AGS may be adjusted into a fourth position that is closer to the second than the first position. In any of the preceding examples where the AGS position is adjusted, the first position may be based on a difference in drag being greater than a threshold and the second position may be based on a first engine coolant temperature threshold and the second position may be further based on a second engine coolant temperature threshold, smaller than the first engine coolant temperature threshold. In such an example, the first engine coolant temperature threshold may be estimated based on the rate of change in the engine coolant temperature and a first set of engine coolant temperature thresholds for an engine, charge air cooler, and air conditioning system. The second engine coolant temperature threshold may be estimated based on the rate of change in the engine coolant temperature and a second set of engine coolant temperature thresholds for the engine, charge air cooler, and air conditioning system. In such an example, the first engine coolant temperature threshold may be greater than the second engine coolant temperature threshold.

As one example, the third position is based on a difference in drag between the first and second positions and the first condition includes when the difference in drag is greater than a threshold. As another example, the fourth position is based on the difference in drag between the first and second positions and the second condition includes when the difference in drag is less than the threshold. Adjusting the AGS into the third position may include actuating a motor coupled to the AGS to decrease a percentage opening of the AGS as a difference in aerodynamic drag between the first and second positions increases. Adjusting the AGS into the fourth position may include actuating a motor coupled to the AGS to increase a percentage opening of the AGS as a difference in aerodynamic drag between the first and second positions decreases.

In yet another example, a system for a vehicle is provided, the vehicle system comprising grille shutters positioned at a front end of the vehicle, a motor coupled to the grille shutters and operable to adjust a position of the grille shutters. A controller with memory and computer-readable instructions stored thereon may be configured to adjust the motor based on a commanded percentage opening of the grille shutters, where the commanded percentage opening is at or between a smaller, first percentage opening and a larger, second percentage opening and based on a difference in aerodynamic drag between the first and second percentage openings, where the first and second percentage openings are estimated based on a rate of change of an engine coolant temperature and engine operating parameters. The engine operating parameters include one or more of an intake manifold temperature of an engine of the vehicle, a charge air temperature, and a temperature of an air conditioning unit of the vehicle. The first percentage opening may be a percentage opening that maintains the engine coolant temperature below a first threshold and the second percentage opening may be a percentage opening that maintains the engine coolant temperature below a second threshold, the second threshold greater than the first threshold.

In this way, vehicle grille shutters may be adjusted based on a rate of change in engine coolant temperature. A controller may determine a first grille shutter position having a smaller percentage opening and second grille shutter position having a larger percentage opening based on an upper, first ECT threshold and a lower, second ECT threshold, respectively. The first and second ECT thresholds may be based on upper and lower ECT temperatures needed to provide cooling to one or more of the engine, an air condition system of the vehicle, a charge air cooler, and charge air entering the engine. While the first ECT threshold may be a maximal allowable ECT, the second ECT threshold may be a lower, more conservative ECT that provides more cooling that the maximal allowable ECT. The controller may estimate the aerodynamic drag at each of the first and second grille shutter positions based on the first and second ECT thresholds and additional engine operating conditions. Then, based on the difference in aerodynamic drag between the first and second positions (and/or a ratio based on the drag values at each of the first and second positions), the controller may determine a final grille shutter position at or between the first and second positions. As the difference in drag increases, penalty to vehicle fuel economy if the grille shutters were adjusted into the second grille shutter position (with the larger percentage opening) increases while the amount of engine cooling increases. Thus, the controller may decide whether decreasing vehicle drag or increasing engine cooling is more beneficial to the engine. Further, when the difference in drag between the two positions decreases, the controller may open the grille shutters by a greater amount since the resulting degradation in fuel economy would be smaller and the benefit to engine cooling may be greater. Thus, a technical effect of adjusting the grill shutters systems between a first and second position based on a difference in drag between the first and second positions and a change in engine coolant temperature is an increase in engine efficiency. Further, by adjusting the grille shutter position based on a change in engine coolant temperature rather than a current engine coolant temperature, overcooling or overheating of the engine coolant, which may result in engine degradation and/or degraded engine performance, may be reduced, thereby further increasing engine efficiency.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
adjusting active grille shutters positioned at a front end of a vehicle into a position at or between a first position having a smaller amount of opening and a second position having a larger amount of opening based on a rate of change of an engine coolant temperature and a difference in aerodynamic drag between the first and second positions.

2. The method of claim 1, wherein adjusting the active grille shutters into the position includes adjusting the active grille shutters closer to the first position than the second position as the difference in aerodynamic drag increases.

3. The method of claim 1, wherein adjusting the active grille shutters into the position includes adjusting the active grille shutters closer to the second position than the first position as the difference in aerodynamic drag decreases.

4. The method of claim 1, further comprising estimating a first engine coolant temperature threshold and a second engine coolant temperature threshold based on the rate of change of the engine coolant temperature and engine coolant temperature thresholds for each of an engine, charge air cooler, and air conditioning system, where the first engine coolant temperature threshold is an upper engine coolant temperature threshold that is greater than the second engine coolant temperature threshold.

5. The method of claim 4, wherein the first and second engine coolant temperature thresholds decrease when the engine coolant temperature is increasing and as the rate of change of the engine coolant temperature increases.

6. The method of claim 4, wherein the first and second engine coolant temperature thresholds increase when the engine coolant temperature is decreasing and as the rate of change in the engine coolant temperature increases.

7. The method of claim 4, wherein the first position is a grille shutter opening that maintains the engine coolant temperature below the first engine coolant temperature threshold and the second position is a grille shutter opening that maintains the engine coolant temperature below the second engine coolant temperature threshold.

8. The method of claim 7, further comprising:
estimating the first position based on a difference between a predicted engine coolant temperature, where the predicted engine coolant temperature is based on the rate of change of the engine coolant temperature, and the first engine coolant temperature threshold and one or more of engine power, air density, air velocity, air temperature, and air humidity; and
estimating the second position based on a difference between the predicted engine coolant temperature and the second engine coolant temperature threshold and one or more of engine power, air density, air velocity, air temperature, and air humidity.

9. The method of claim 1, further comprising estimating the aerodynamic drag for each of the first position and the second position based on a percentage opening at each of the first position and the second position, air density, vehicle speed, wind speed, and air temperature.

10. The method of claim 1, further comprising determining the position based on a determined amount of degradation in aerodynamic drag between the second position and the first position.

11. The method of claim 10, wherein the determined amount of degradation in aerodynamic drag between the second position and the first position is estimated based on a ratio between the difference in aerodynamic drag.

12. A method, comprising:
    determining a smaller, first position having a smaller amount of opening and a larger, second position having a larger amount of opening of active grille shutters (AGS) positioned at a front end of a vehicle based on a rate of change in engine coolant temperature;
    during a first condition, adjusting the AGS into a third position that is closer to the first than the second position; and
    during a second condition, adjusting the AGS into a fourth position that is closer to the second than the first position.

13. The method of claim 12, wherein the first position is further based on a first engine coolant temperature threshold and wherein the second position is further based on a second engine coolant temperature threshold, smaller than the first engine coolant temperature threshold.

14. The method of claim 13, further comprising estimating the first engine coolant temperature threshold based on the rate of change in the engine coolant temperature and a first set of engine coolant temperature thresholds for an engine, charge air cooler, and air conditioning system and estimating the second engine coolant temperature threshold based on the rate of change in the engine coolant temperature and a second set of engine coolant temperature thresholds for the engine, charge air cooler, and air conditioning system, where the first engine coolant temperature threshold is greater than the second engine coolant temperature threshold.

15. The method of claim 12, wherein the third position is based on a difference in drag between the first position and the second position and wherein the first condition includes when the difference in drag is greater than a threshold.

16. The method of claim 15, wherein the fourth position is based on the difference in drag between the first and second positions and wherein the second condition includes when the difference in drag is less than a threshold.

17. The method of claim 12, wherein adjusting the AGS into the third position includes actuating a motor coupled to the AGS to decrease a percentage opening of the AGS as a difference in aerodynamic drag between the first position and the second position increases and wherein adjusting the AGS into the fourth position includes actuating a motor coupled to the AGS to increase a percentage opening of the AGS as a difference in aerodynamic drag between the first position and the second position decreases.

18. A system for a vehicle, comprising:
    grille shutters positioned at a front end of the vehicle;
    a motor coupled to the grille shutters and operable to adjust a position of the grille shutters; and
    a controller with non-transitory memory and computer-readable instructions stored thereon, the computer-readable instructions executable by a processor and configured for:
        adjusting the motor based on a commanded percentage opening of the grille shutters, where the commanded percentage opening is at or between a smaller, first percentage opening and a larger, second percentage opening and based on a difference in aerodynamic drag between the first and second percentage openings, where the first and second percentage openings are estimated based on a rate of change of an engine coolant temperature and engine operating parameters.

19. The system of claim 18, wherein the engine operating parameters include one or more of an intake manifold temperature of an engine of the vehicle, a charge air temperature, and a temperature of an air conditioning unit of the vehicle.

20. The system of claim 18, wherein the first percentage opening is a percentage opening that maintains the engine coolant temperature below a first threshold and the second percentage opening is a percentage opening that maintains the engine coolant temperature below a second threshold, the second threshold greater than the first threshold.

* * * * *